(12) United States Patent
Ortega

(10) Patent No.: US 11,093,546 B2
(45) Date of Patent: Aug. 17, 2021

(54) METHOD FOR CATEGORIZING DIGITAL VIDEO DATA

(71) Applicant: The Procter & Gamble Company, Cincinnati, OH (US)

(72) Inventor: Jose M Ortega, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 160 days.

(21) Appl. No.: 16/200,782

(22) Filed: Nov. 27, 2018

(65) Prior Publication Data

US 2019/0163701 A1 May 30, 2019

Related U.S. Application Data

(60) Provisional application No. 62/591,793, filed on Nov. 29, 2017.

(51) Int. Cl.
| | |
|---|---|
| *G06F 17/00* | (2019.01) |
| *G06F 16/75* | (2019.01) |
| *G06F 16/74* | (2019.01) |
| *G06K 9/62* | (2006.01) |
| *G06K 9/00* | (2006.01) |

(52) U.S. Cl.
CPC .............. *G06F 16/75* (2019.01); *G06F 16/74* (2019.01); *G06K 9/00744* (2013.01); *G06K 9/6215* (2013.01); *G06K 9/6221* (2013.01); *G06K 9/6277* (2013.01)

(58) Field of Classification Search
CPC ....... G06F 16/74; G06F 16/75; G06K 9/6215; G06K 9/6277; G06K 9/6221; G06K 9/00744

See application file for complete search history.

(56) References Cited

U.S. PATENT DOCUMENTS 8,600,143 B1* 12/2013 Kulkarni .............. G06K 9/6219
382/133
2008/0222109 A1* 9/2008 Sakurai ............... G06F 16/2477

(Continued)

OTHER PUBLICATIONS

S. Papadopoulos, C. Zigkolis, Y. Kompatsiaris and A. Vakali, "Cluster-Based Landmark and Event Detection for Tagged Photo Collections," in IEEE MultiMedia, vol. 18, No. 1, pp. 52-62, Jan. 2011.*

(Continued)

*Primary Examiner* — Greta L Robinson

(74) *Attorney, Agent, or Firm* — Amanda T Barry; Jason J Camp

(57) ABSTRACT

In one aspect, a computer implemented method for extracting information on actions or activities captured in digital data includes steps of: providing a first digital data set, extracting and characterizing first features from the first digital data set, creating first clusters from the extracted first features according to probability density functions and reference function distance calculations, providing a second digital data set, extracting and characterizing second features from the second digital data set, characterizing the extracted second features according to probability density functions and reference function distance calculations, and matching the second extracted features to a portion of the first extracted features clusters according to similarities in reference function distance calculations.

5 Claims, 1 Drawing Sheet

(56) References Cited

U.S. PATENT DOCUMENTS

| | | | | |
|---|---|---|---|---|
| 2008/0298643 | A1* | 12/2008 | Lawther | G06K 9/00677 382/118 |
| 2009/0091798 | A1* | 4/2009 | Lawther | G06F 16/58 358/3.28 |
| 2010/0049711 | A1* | 2/2010 | Singh | G11B 27/28 707/758 |
| 2015/0030252 | A1* | 1/2015 | Corso | G06K 9/00744 382/197 |
| 2019/0130641 | A1* | 5/2019 | Barajas Hernandez | G06T 17/20 |

OTHER PUBLICATIONS

J. Yao, B. Cui, Y. Huang and Y. Zhou, "Detecting bursty events in collaborative tagging systems," 2010 IEEE 26th International Conference on Data Engineering (ICDE 2010), Long Beach, CA, 2010, pp. 780-783, Apr. 2010.*

M. Wang, R. Hong, G. Li, Z. Zha, S. Yan and T. Chua, "Event Driven Web Video Summarization by Tag Localization and Key-Shot Identification," in IEEE Transactions on Multimedia, vol. 14, No. 4, pp. 975-985, Aug. 2012.*

* cited by examiner

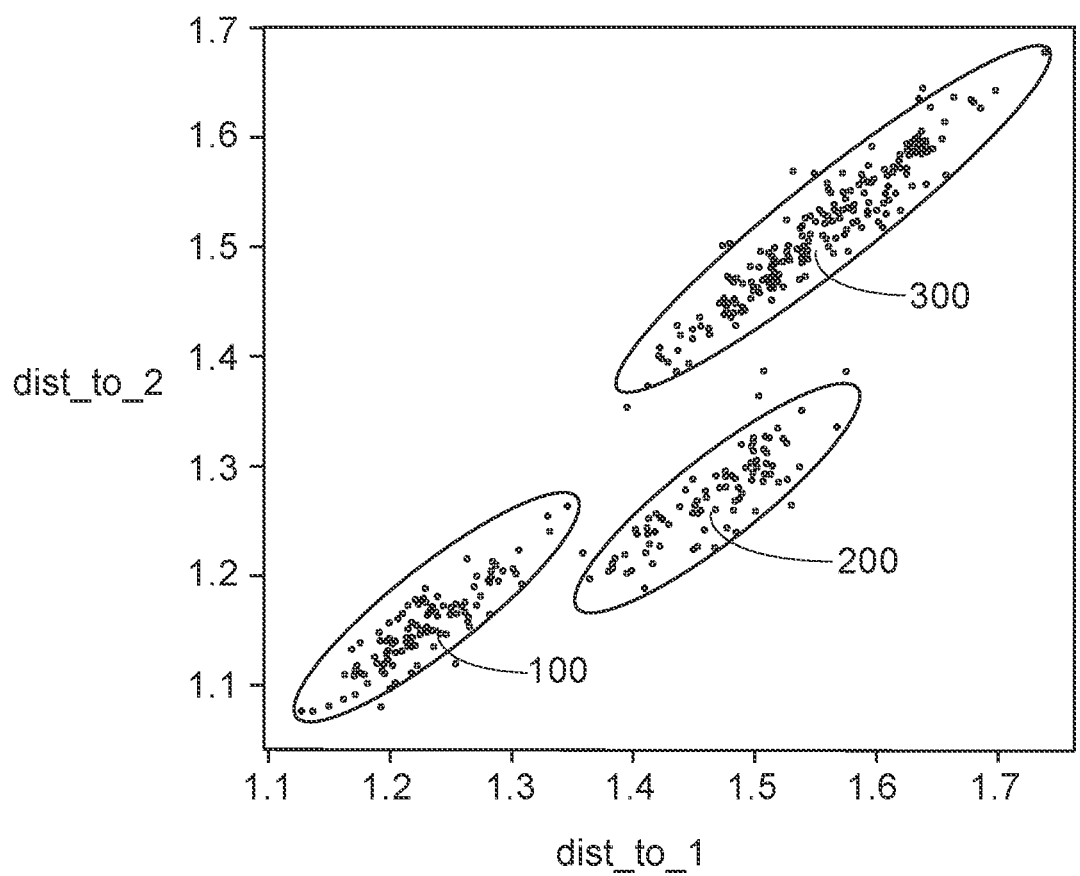

METHOD FOR CATEGORIZING DIGITAL VIDEO DATA

FIELD OF THE INVENTION

The invention relates to methods for categorizing digital data. The invention relates particularly to categorizing digital video data by tagging actions captured in the data.

BACKGROUND OF THE INVENTION

The automated recognition of objects and elements in images is known in the art. Faces, smiles people, animals may each be detected in images using automated computer analysis systems. Recognition of actions captured in images remains a challenge as actions may require abstract conceptualization, are not easily captured in still images, defining the target action to be tagged can be nuanced, for example: walking versus limping versus running as the action to be tagged. Typical methods for utilizing artificial intelligence systems including deep learning systems, require providing training data sets with both input data and identified output results. In the case of image tagging such a system may require extensive manual intervention to construct a training data set including human viewing of the images along with labeling the respective motions and activities captured in the data. Each training set may be of limited utility or tagging range. A training set built to tag one action, walking, may be of little, if any use in training a system to tag limping or running. Each activity may require the construction of an individual data set requiring cost prohibitive amounts of time, and resources, including human supervision, to create. What is needed is an unsupervised method for tagging actions and activities in data, based upon characterization of patterns using probability measures, which does not rely upon extensive human involvement in labeling data for training or establishing the functionality of the system, an unsupervised action or activity tagging method and system.

SUMMARY OF THE INVENTION

In one aspect, a computer implemented method for extracting information on actions or activities captured in digital data includes steps of: providing a first digital data set, extracting and characterizing first features from the first digital data set, creating first clusters from the extracted first features according to probability density functions and reference function distance calculations, providing a second digital data set, extracting and characterizing second features from the second digital data set, characterizing the extracted second features according to probability density functions and reference function distance calculations, and matching the second extracted features to a portion of the first extracted features clusters according to similarities in reference function distance calculations.

In one aspect, a computer implemented method for extracting information on actions or activities captured in digital data includes steps of: providing a first digital data set, extracting and characterizing first features from the first digital data set, creating first clusters from the extracted first features according to probability density functions and reference function separation calculations, identifying actions according to the created first clusters.

BRIEF DESCRIPTION OF THE DRAWINGS

The FIGURE provides a graphical illustration of feature clustering and feature matching according to one embodiment of the invention.

DETAILED DESCRIPTION OF THE INVENTION

As used herein, the term action refers to the movement of an object, exemplary actions include: hand gestures, and facial expressions.

As used herein, the term activity means a set of actions directed toward a task and including: walking, running, sweeping, cleaning, dusting, mopping, vacuuming, shaving, oral care tasks, child care tasks, etc.

As used herein, the term: "probability density function" refers to a function which provides an indication of the relative likelihood of different possible values of a variable in a sample space.

As used herein, the term: "reference probability density function", refers to probability density functions having the same number of variable dimensions as the probability density functions of interest and having values used to define a sample space for comparing variable probability density function values in the defined sample space.

Reference distributions ideally represent orthogonal random variables, in the sense that they are perpendicular at each other. For example the dimensional vector of Cartesian coordinates (x,y) is an orthogonal coordinate system, since its coordinate surfaces x=constant, y=constant are perpendicular planes. More specifically, two random variables are orthogonal when the inner product (or the expected value of the product) is 0. When tracking the position changes of objects across a sequence of frames using Cartesian coordinates (x,y), a straight choice for reference functions would be the standard Gaussian distributions x~Normal(0,1) and y~Normal(0,1), which are orthogonal (E[XY]=0).

In one embodiment, a computer implemented method for extracting information on actions or activities captured in digital data comprises providing a first digital data set comprising a temporal sequence of data frames. The first data set may include digital video data as well as digital inertia sensor data associated with the displacement, velocity and acceleration of an object. The data comprises time sequenced data which may be considered and analyzed as a sequence of data frames corresponding to images or moving objects.

The data may be captured using digital camera systems or digital inertial sensors. The data may be stored and provided to the analysis system using transient or non-transient data storage media. The data may be presented in an electronically readable format.

The analysis system comprises one or more data reading systems adapted to read the provided data media. The system may comprise wired or wireless communications systems for receiving data and instructions as well as for providing output after or during analysis.

The system comprises system memory for storing instructions, data and results of the analysis. The system further comprises one or more central processing units adapted to execute the instructions associated with performing the steps of the method to analyze the data set, as well as output components adapted to enable the presentation of the data and the results of the analysis. The system may benefit from a cluster of processors enabling parallel processing of method steps. Peripheral equipment such as a keyboard, pointing device and display components may be included in the system as well.

The steps of the method may be coded using any suitable scientific programming language together with one or more deep learning languages. Exemplary scientific languages include: SAS, Python, R, and SQL.

The data set is evaluated using artificial intelligence techniques, including deep learning convolutional neural networks, to identify objects of interest in the data frames. Deep learning systems may be trained to recognize particular objects in the data such as dogs, cats, and human beings, both children and adults. Exemplary deep learning systems include: YOLO, (you only look once), an open source system that provides object detection capabilities on the Pascal VOC 2012 database, and TENSORFLOW® for object detection using the COCO (Common Objects In Context) dataset, available from Google, Mountain View, Calif.

Once identified, objects may be tracked across sequences of data frames. The system may determine and track the position of the object, the size of the object—in terms of the locations of the corners of a box configured to contain the object, the name of the identified object and the probability that the identified objects actually is the named object. This set of information may be tracked frame by frame across the set of data frames from the initial appearance and recognition of the object until the end of the sequence where the object is no longer recognized as being in the data frame. The result is a time series of the state vector including the dimensions of position, size, class (name of the object) and probability that the object is correctly identified with the class. The time series of values will reflect changes in the size and position of the object from frame to frame across the sequence of frames. The data of the time series may be normalized or reparametrized using standard statistical techniques to account for variations introduced by the camera angle, image resolution, object position, and the distance from the camera to the object over the course of the sequence of data frames. Exemplary techniques include: 0-1 rescaling, mean normalization, log transformation, and z-transform standardization.

Changes in individual or groups of variables from frame to frame may be used for additional calculations. Exemplary calculations include velocity and acceleration of objects through the sequence of frames based upon the changes in position of the object from frame to frame.

The time series of the state vector may then be modeled using stochastic process and probability functions to yield a probability density function associated with the set of state vector variables over the course of the sequence. The probability density function for sequences depicting similar actions will also be similar.

In one embodiment, the time series data may be characterized using a Gaussian mixtures model. In one embodiment, the time series data may be characterized using a Multinomial-Dirichlet model on discretized variables.

Reference probability density function values may be created using likely values for the respective state vector variables. As all the analyzed sequences will be evaluated relative to the same set of reference probability density function, the absolute values used in the creation of the reference probability density functions are not significant. The reference probability density functions may include one or more sets of orthogonal variables.

The probability density function of the state vector associated with each analyzed sequence may be evaluated in terms of the distance of the sequence probability density function value from the respective reference probability functions. This calculation yields a vector associated with the difference between the instant probability density function and the reference functions. The resultant vector comprises a dimension for each variable of the state vector associated with the data frames. Calculating the distance may include calculating the Bhattacharyya distance, or other suitable statistical distance calculations, between the data probability density functions and the reference probability density functions.

The respective sequences of the data set may then be associated with each other according to the relative values of their respective probability density functions derived from their state vector sequence. Probability density functions located near to each other depict similar actions and activities and those sequences separated associated with vectors separated from each other have fewer commonalities. The probability density function data points may be categorized as clusters based upon this relative value comparison.

As illustrated in the FIGURE, a data set comprising four hundred records was evaluated according to the methods of the invention. Feature extraction and characterization using two reference probability density function resulted in three populations of the record, 100, 200, and 300. Each of the respective populations includes records comprising similar actions.

In one embodiment, a second data set comprising data frames may be provided to the system of the method. The second set of data may include one or more sequences of a particular action or activity. The second set of data may be evaluated as described above. The evaluation may yield a probability density function for the second data set which may then be used to calculate the distance from the reference probability data function(s). The calculated distance from the reference function(s) may then be used to identify sequences from the first data set which are related to the same particular action or activity captured in the second data set. In this manner, sequences related to the desired particular action or activity may be extracted from the first data set without the need for supervised data tagging of any of the data in the first data set.

As illustrated in the FIGURE, a data set comprising four hundred records was evaluated according to the methods of the invention. Feature extraction and characterization using two reference probability density function resulted in three populations of the record, 100, 200, and 300. Each of the respective populations includes records comprising similar actions. A new data set was characterized resulting in the record indicated as 400 in the FIGURE. This characterization of the record and relative position on the graph indicates that the records of population 300 are similar to the new record in terms of the actions captured in the records of population 300.

Combinations:
  A. A computer implemented method for extracting information on actions or activities captured in digital data comprising steps of:
    a. providing a first digital data set comprising a temporal sequence of data frames;
    b. extracting and characterizing first features from the first digital data set;
    c. determining probability density function values for the first features;
    d. defining reference probability density functions;

e. creating first clusters from the extracted first features according to first feature probability density function values and reference function distance calculations;
f. providing a second digital data set;
g. extracting and characterizing second features from the second digital data set;
h. characterizing the extracted second features according to probability density functions and reference function distance calculations; and
i. matching the second extracted features to a portion of the first extracted features clusters according to similarities in reference function distance calculations.

B. The computer implemented method according to paragraph A wherein the step of extracting and characterizing features comprises:
   a. identifying objects in the data frames;
   b. determining the size and position of identified objects;
   c. tracking the absolute position of the identified objects across a sequence of data frames;
   d. determining relative distances between objects across the data frame sequence,
   e. determining changes in tracked object dimensions across the data frame sequence;
   f. normalizing static and transition variables across the sequence of data frames C. The computer implemented method according to paragraph A or B wherein the step of creating first clusters from the extracted first features according to first feature probability density function values and reference function distance calculations comprises calculating the Bhattacharyya distance between the first extracted feature probability density function values and the reference probability density functions.

D. The computer implemented method according to paragraph A, B, or C wherein the reference probability functions comprise orthogonal random variables.

E. A computer implemented method for extracting information on actions or activities captured in digital data comprising steps of:
   a. providing a first digital data set comprising a temporal sequence of data frames;
   b. extracting and characterizing first features from the first digital data set;
   c. determining probability density function values for the first features;
   d. defining reference probability density functions;
   e. creating first clusters from the extracted first features according to first feature probability density function values and reference function distance calculations; and
   f. categorizing a cluster according to the first features.

F. The computer implemented method according to paragraph E wherein the step of extracting and characterizing features comprises:
   a. identifying objects in the data frames;
   b. determining the size and position of identified objects;
   c. tracking the absolute position of the identified objects across a sequence of data frames;
   d. determining relative distances between objects across the data frame sequence,
   e. determining changes in tracked object dimensions across the data frame sequence;
   f. calculating continuous variables across the sequence of data frames; and
   g. normalizing transition variables across the sequence of data frames.

G. The computer implemented method according to paragraph E, or F, wherein the step of creating first clusters from the extracted first features according to first feature probability density function values and reference function distance calculations comprises calculating the Bhattacharyya distance between the first extracted feature probability density function values and the reference probability density functions.

H. The computer implemented method according to paragraph E, F, or G, wherein the reference probability functions comprise orthogonal random variables.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer implemented method for extracting information on actions captured in digital data comprising steps of:
   a. providing a first digital data set comprising a temporal sequence of data frames;
   b. extracting and characterizing first features from the first digital data set;
   c. determining probability density function values for the first features;
   d. defining reference probability density functions;
   e. creating first clusters from the extracted first features according to first feature probability density function values and reference function distance calculations wherein the first clusters result in one or more populations, each population including records having similar actions;
   f. providing a second digital data set having one or more sequences of an action or activity;
   g. extracting and characterizing second features from the second digital data set;
   h. characterizing the extracted second features according to probability density functions and reference function distance calculations; and
   i. matching the second extracted features to a portion of the first extracted features clusters according to similarities in reference function distance calculations, such that the second extracted features can be identified as an action.

2. The computer implemented method according to claim 1 wherein the step of extracting and characterizing features comprises:
   a. identifying objects in the data frames;
   b. determining the size and position of identified objects;
   c. tracking the absolute position of the identified objects across a sequence of data frames;
   d. determining relative distances between objects across the data frame sequence,
   e. determining changes in tracked object dimensions across the data frame sequence;
   f. normalizing static and transition variables across the sequence of data frames.

3. The computer implemented method according to claim 1 wherein the step of creating first clusters from the extracted first features according to first feature probability density function values and reference function distance calculations comprises calculating the Bhattacharyya distance between the first extracted feature probability density function values and the reference probability density functions.

4. The computer implemented method according to claim 1 wherein the reference probability functions comprise orthogonal random variables.

5. A computer implemented method for extracting information on actions captured in digital data comprising steps of:
   a. providing a first digital data set comprising a temporal sequence of data frames;
   b. extracting and characterizing first features from the first digital data set;
   c. determining probability density function values for the first features;
   d. defining reference probability density functions;
   e. creating first clusters from the extracted first features according to first feature probability density function values and reference function distance calculations; and
   f. categorizing a cluster according to the first features;
   wherein the step of extracting and characterizing features comprises:
      i. identifying objects in the data frames;
      ii. determining the size and position of identified objects;
      iii. tracking the absolute position of the identified objects across a sequence of data frames;
      iv. determining relative distances between objects across the data frame sequence,
      v. determining changes in tracked object dimensions across the data frame sequence;
      vi. calculating continuous variables across the sequence of data frames; and
      vii. normalizing transition variables across the sequence of data frames.

* * * * *